Dec. 28, 1948.  R. PEALE ET AL  2,457,267
COAL LOADING AND CONVEYING MECHANISM
Filed Jan. 29, 1945  9 Sheets-Sheet 1

INVENTORS
RICHARD PEALE
REMBRANDT PEALE, JR.
BY
Hobart N. Durham
Attorney

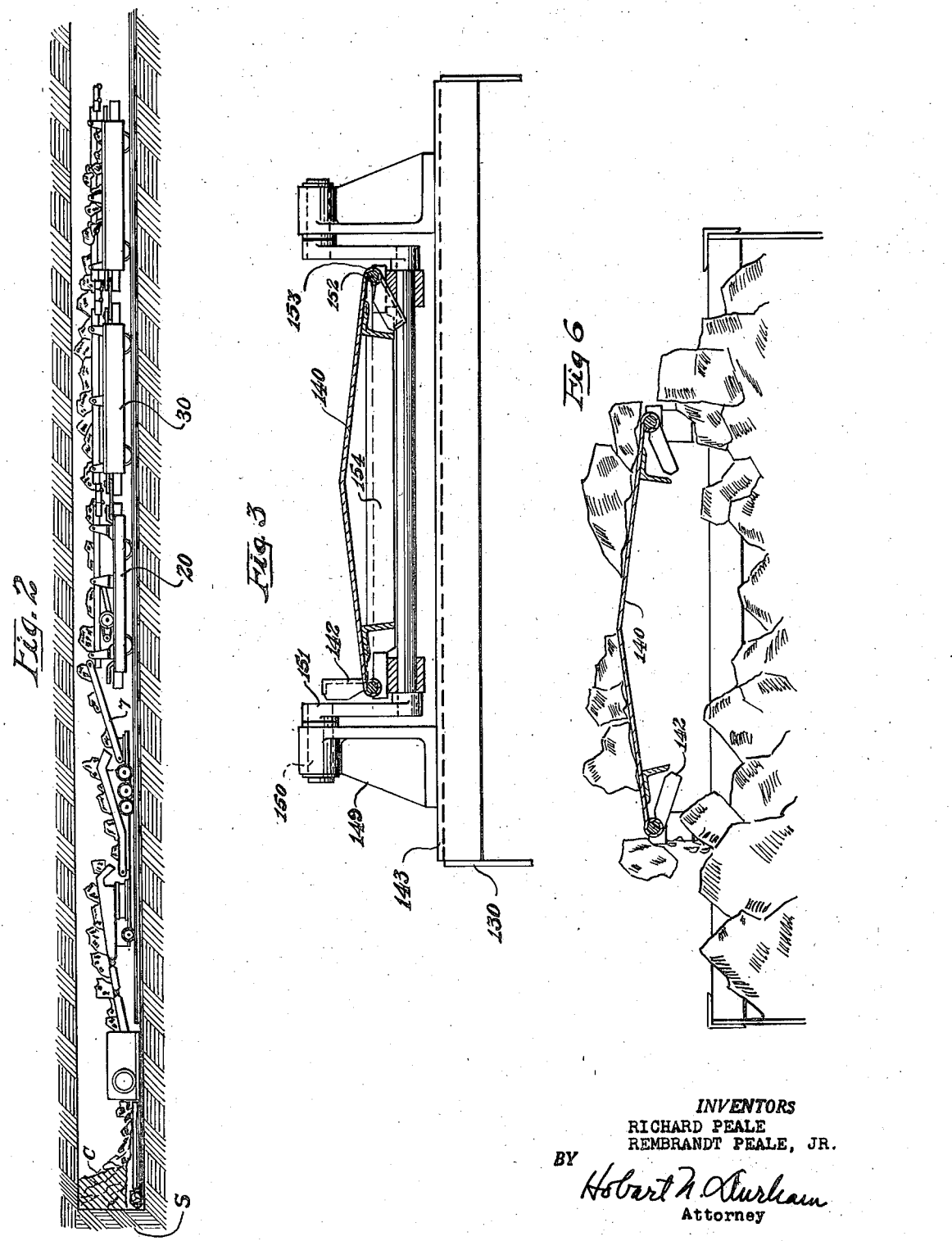

Dec. 28, 1948.  R. PEALE ET AL  2,457,267
COAL LOADING AND CONVEYING MECHANISM
Filed Jan. 29, 1945  9 Sheets-Sheet 3

INVENTORS
RICHARD PEALE
REMBRANDT PEALE, Jr.
BY
Attorney

Dec. 28, 1948.	R. PEALE ET AL	2,457,267
COAL LOADING AND CONVEYING MECHANISM
Filed Jan. 29, 1945	9 Sheets-Sheet 4
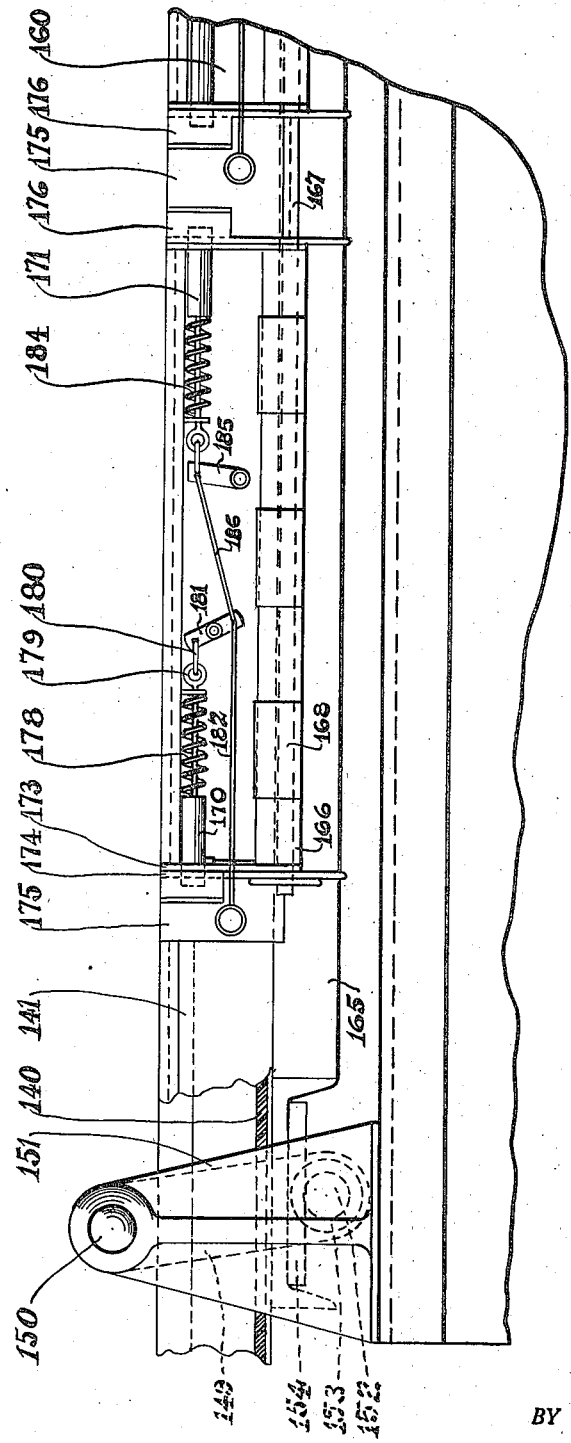
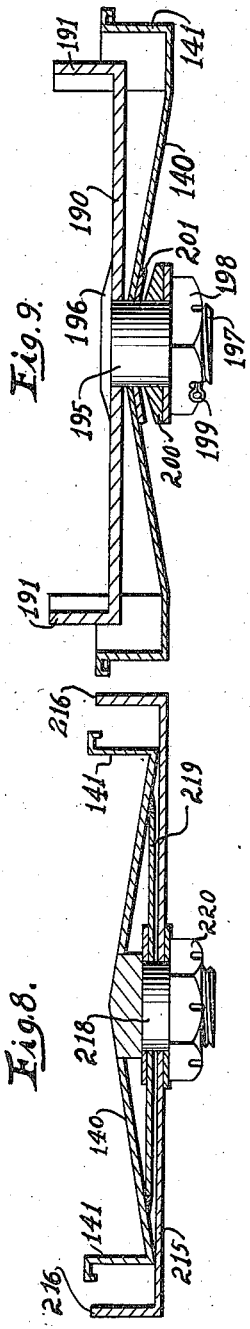
INVENTORS
RICHARD PEALE
REMBRANDT PEALE, JR.
BY
Attorney Dec. 28, 1948.  R. PEALE ET AL  2,457,267
COAL LOADING AND CONVEYING MECHANISM
Filed Jan. 29, 1945  9 Sheets-Sheet 5

INVENTORS
RICHARD PEALE
REMBRANDT PEALE, JR.
BY
Hobart N. Durham
Attorney

Dec. 28, 1948.  R. PEALE ET AL  2,457,267
COAL LOADING AND CONVEYING MECHANISM
Filed Jan. 29, 1945  9 Sheets-Sheet 6
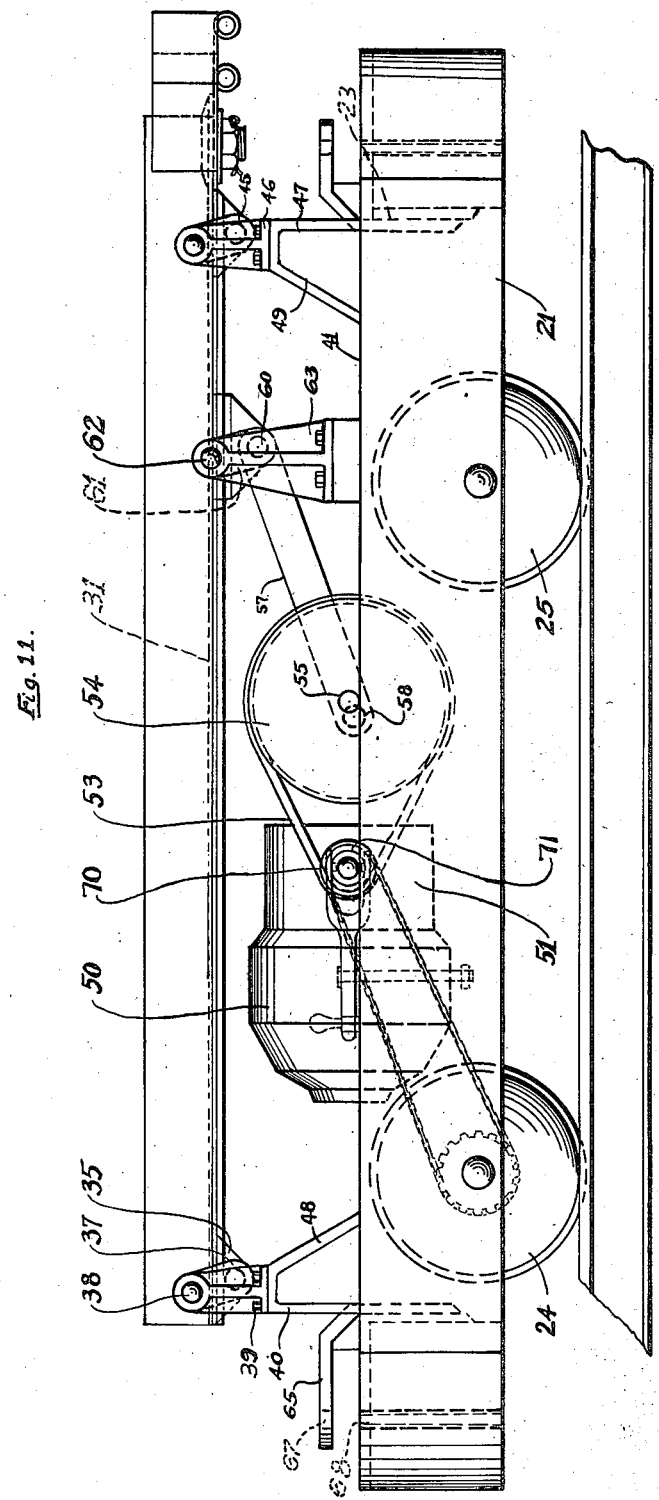
INVENTORS
RICHARD PEALE
REMBRANDT PEALE, JR.
BY Hobart N. Durham
Attorney

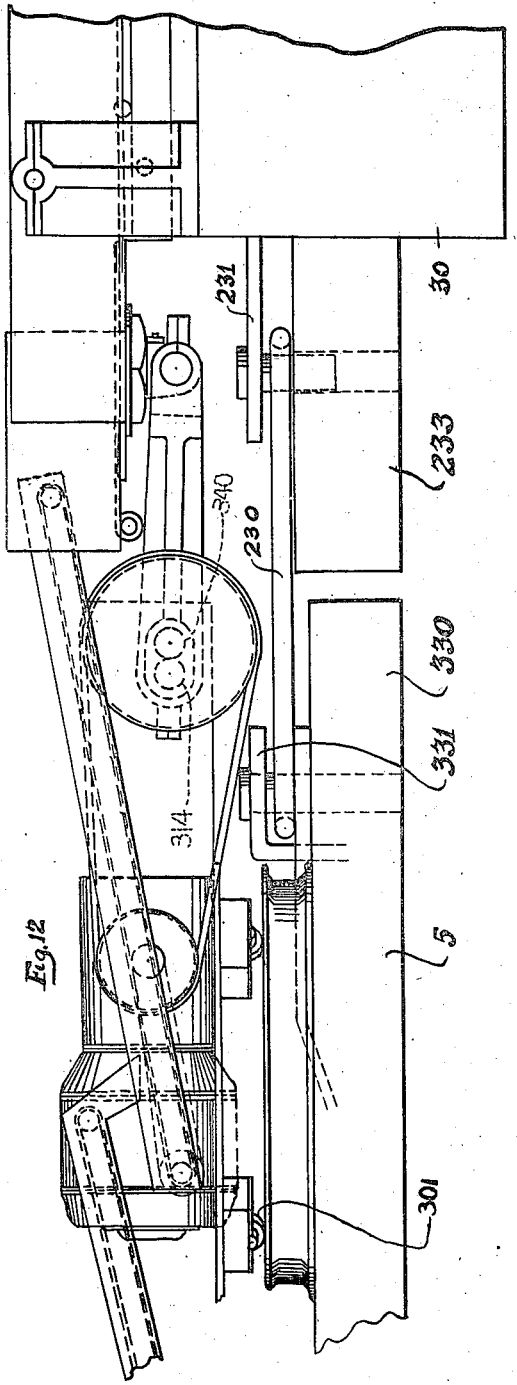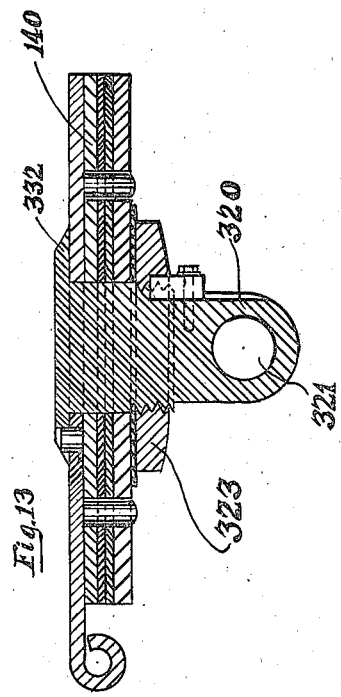

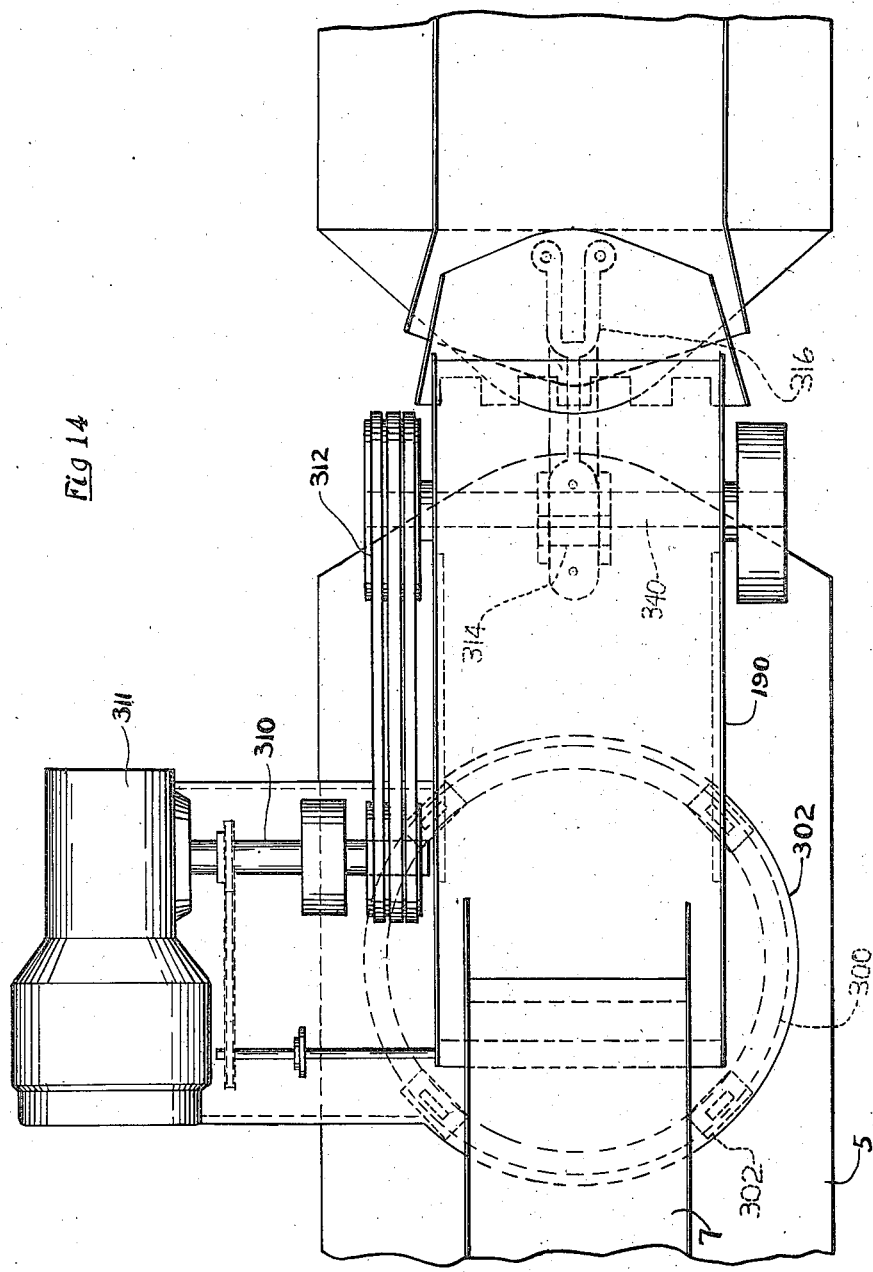

Dec. 28, 1948.   R. PEALE ET AL   2,457,267
COAL LOADING AND CONVEYING MECHANISM
Filed Jan. 29, 1945   9 Sheets-Sheet 9
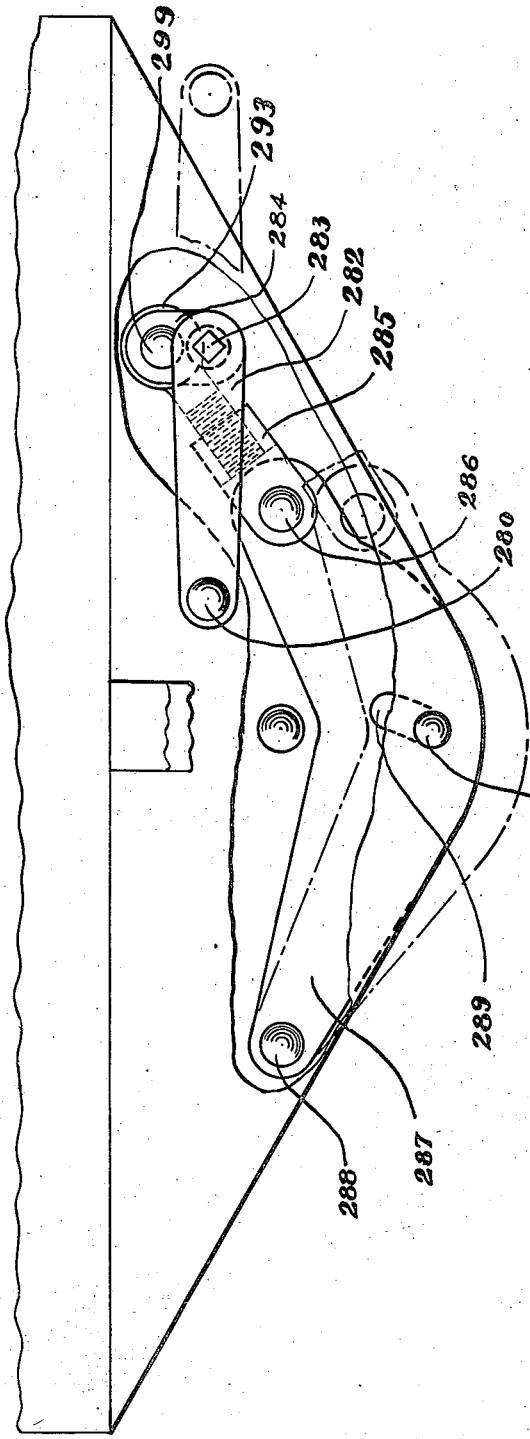
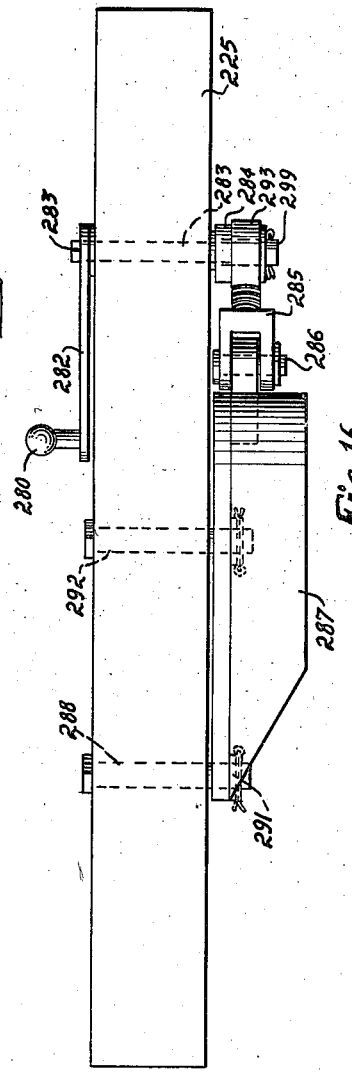
INVENTORS
RICHARD PEALE
REMBRANDT PEALE, JR.
BY
*Hobart N. Durham*
Attorney.

Patented Dec. 28, 1948

2,457,267

UNITED STATES PATENT OFFICE 2,457,267

COAL LOADING AND CONVEYING MECHANISM

Richard Peale, Clearfield, Pa., and Rembrandt Peale, Jr., Greenwich, Conn., assignors to themselves as trustees Application January 29, 1945, Serial No. 575,080

7 Claims. (Cl. 214—41)

The invention relates to loading and conveying coal and more especially to novel and useful mechanism for gathering coal at the mine face and conveying same therefrom to portable receptacles for delivery from the mine.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is a longitudinal side elevation of part of the apparatus shown in Fig. 1;

Fig. 3 is a fragmentary enlarged end elevation of a loading and conveying car unit, viewed from the left-hand end of Fig. 4;

Fig. 4 is a top plan view of the coal car conveying unit embodying the invention;

Fig. 5 is a side elevation of the unit car shown in Fig. 4;

Fig. 6 is a partly diagrammatic fragmentary section taken on line 6—6 of Fig. 4 and showing the condition of a loaded car at such section.

Fig. 7 is an enlarged fragmentary side elevation, with parts in section, of the upper portion of a unit car showing details of the conveyor mounted and delivery gate construction;

Fig. 8 is a detail elevation taken on line 8—8 of Fig. 4;

Fig. 9 is a similar section taken on line 9—9 of Fig. 4;

Fig. 11 is a side elevation of the drive car shown in Fig. 10;

Fig. 12 is a fragmentary side elevation of a modification wherein the conveyor drive is mounted on the mobile loader;

Fig. 13 is an enlarged detail in vertical section showing the coupling bolt for connecting the conveyor to the driving mechanism;

Fig. 14 is a top plan view of the mechanism shown in Fig. 12;

Fig. 15 is a fragmentary detail, in top plan, with parts broken away, showing an extensible bumper construction; and Fig. 16 is a front end elevation of the mechanism shown in Fig. 15.

Figure 1:
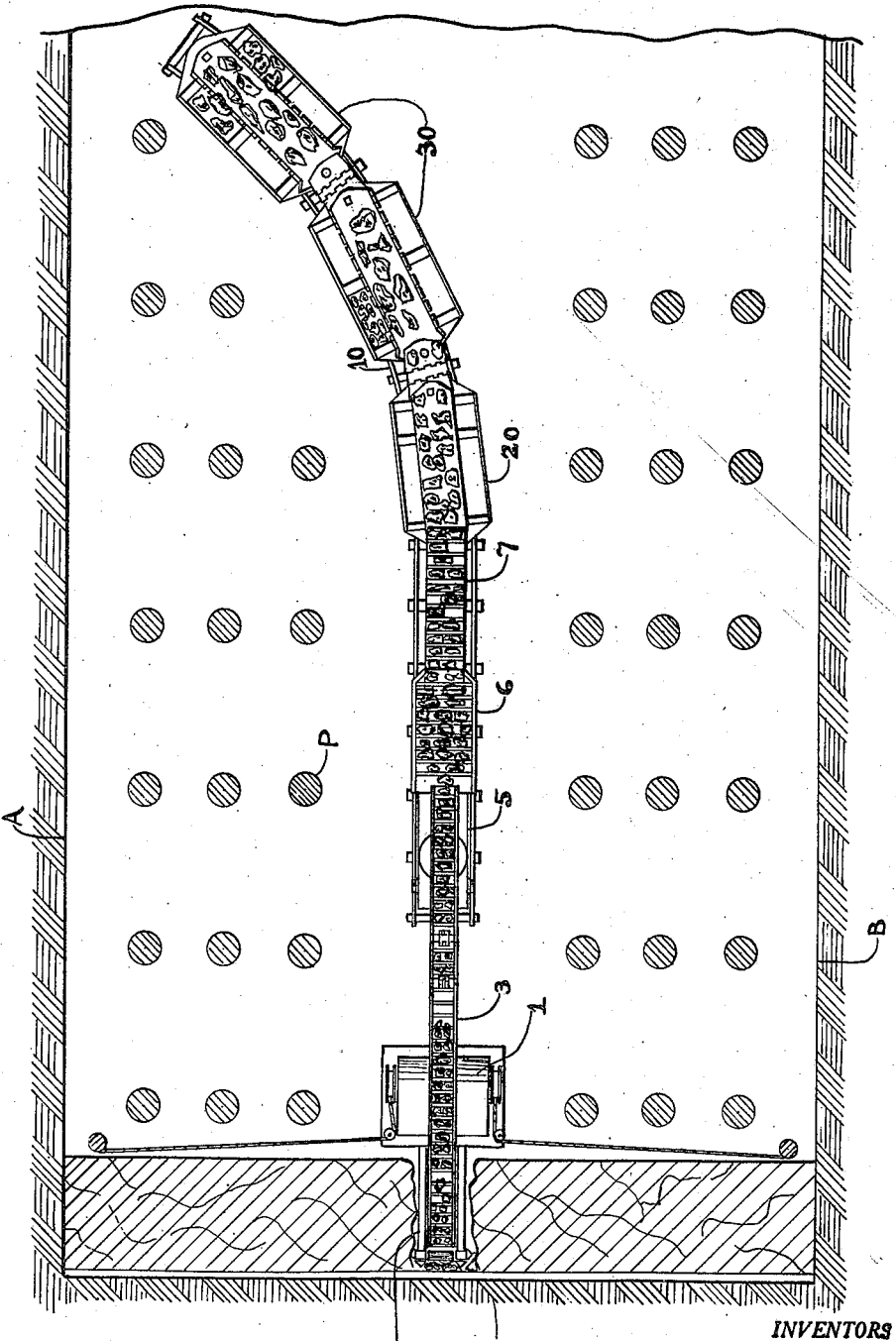
Fig. 1 is a partly diagrammatic plan view of apparatus embodying the invention shown in operating loading position in a mine room.

In mining coal by conventional commercial methods it is customary to convey the shot-down coal at the room face, either by hand or by a mechanical loader into a car supported on tracks in the room and leading therefrom to a main heading. Because of space considerations and the necessity for close timbering to support the roof, a single narrow trackway is customarily laid from the face along the room to the heading and in operations where a mobile track mounted loader is employed, said loader is mounted on the track and occupies the end thereof adjacent to the shot-down face. Such mobile loader will gather coal at the face and convey it rearwardly or "outby" into a mine car until the car is filled. The usual practice is to fill the car, run it out to the heading where there is room for switching and then bring in an empty car to receive coal from the loader. Considerable delay is entailed in moving the full car out and bringing in the empty one, such delays becoming greater as the face of the room is advanced up to a customarily maximum of about 300 ft. During all such times when the car is not stationed at the loader to receive coal, the loader is necessarily idle and time is lost which could otherwise be employed in loading out the coal which has been shot down and waiting to be loaded.

One object of the invention is to provide coal receiving and conveying apparatus whereby all the coal shot down at a mine face may be continuously loaded, either by a mechanical loader, by hand or otherwise, without interruptions or delays entailed in removing loaded cars and providing empty ones.

Another object of the invention is to provide such apparatus which will operate efficiently in low seam mines where head room is at a premium. In low seam mines (usually regarded as having a seam height of approximately 30" or less), it has heretofore been impossible to employ in the mine room track-mounted cars of capacity sufficient to contain any worthwhile amount of coal and the delays entailed in shuttling the loaded and empty cars, as aforesaid, make the use of track-mounted room cars prohibitive. The invention not only eliminates all the delays which heretofore militated against the use of such cars in low seam mines, but also enables continuous loading of the entire shot-down cut of a room face into a string of cars capable of receiving the entire cut without any shuttling or other delay.

Various previous attempts have been made to enable such continuous loading of a string of cars. Such attempts have been unsuccessful, especially in low seam mines, because of the additional head space and timbering space occupied by the bulky additional apparatus provided in such former expedients. The invention provides exceedingly simple, efficient apparatus for the continuous loading of a plurality of cars without sacrificing any vertical or horizontal space and is therefore especially well adapted for operation in low seam mines.

Another object of the invention is to provide a combination coal car and conveying unit which operates both to receive coal delivered to the car and also to convey coal beyond said car to other cars coupled therewith. By virtue of this feature of the invention any number of coal cars may be joined together to receive and convey coal to all of the cars of the string. Consequently and because each car is a self-sufficient receiving and conveying unit, any number thereof may be coupled together to take the output of any cut or pile of coal regardless of the amount. Also each car unit may be filled and detached from the string of cars without interfering with the filling and conveying of coal to the other cars in the string, so that the loading of a string of cars of any selected number is independent of the number of cars and independent of any auxiliary apparatus.

Another object of the invention is to provide means whereby a plurality of coal-receiving and conveying car units may be coupled to each other and operate as a combined unit regardless of the unevenness of the mine floor on which the trackway is mounted and regardless of any curvature or other irregularities in the track bed, either vertical or horizontal. In this connection also the invention provides for the close and accurate coupling of such units so that the interlocked conveying means of the group of units will operate while still permitting movement of the string of cars and allowing sufficient flexibility in said string to permit the units thereof to accommodate themselves to irregularities in the trackway as aforesaid.

Another object of the invention is to provide a novel combination of coal receiving car and shaking conveyor adapted to function as an independent loading unit by itself or in combination with other similar units coupled therewith to form a string of such units, which string may contain an indefinite number of such units.

Another object of the invention is to provide a combined coal loading and conveying mobile track-mounted unit or plurality of such units coupled together which may be moved wherever desired in the track system of a coal mine under power provided by track-mounted driving units without requiring auxiliary locomotives or other traction means.

Another object of the invention is to provide a combined coal receiving and conveying car unit which can be coupled to a track-mounted mobile loader and driven and moved in unison therewith so that the loading, conveying and receiving of the coal is a continuous operation.

Another object of the invention is to provide such a coal receiving and conveying unit car wherein coal may be delivered to any selected locus within the car or may be conveyed through or across the car for delivery elsewhere; the invention providing very simple, rugged and accurate means for such selective disposition of the coal being handled by the conveying means of such unit or units.

Another object of the invention is to provide novel shaker conveyor mechanism incorporated in and as a part of the construction of a mine car without substantially diminishing the coal capacity of each car and without increasing the head room required for a loader car.

Broadly described, the invention provides a substantially self-sufficient coal receiving and conveying unit car—that is, a track-mounted coal car having supported lengthwise along its top a shaker conveyor which, when reciprocated relatively to the car on which it is supported for oscillating movement, will cause coal or other material to travel along the surface of the shaking conveyor pan and thus lengthwise along the top of the open car. The pan or coal carrying and conveying surface of this oscillatory, longitudinally-disposed conveyor is adapted to spill coal from any selected portion of its length by means of selectively movable gates along the sides of the pan through which the coal may be dumped. Thus coal may be delivered into the body of the car from the conveyor mounted along its top and the coal may be so delivered to any relatively closely selected portion of said car. The car, and the conveyor mounted thereon, are adapted to be coupled at either end to similar cars and self-contained conveyor units so that a string of said conveyor cars may be so coupled together whereby oscillating movement imparted to one of the conveyors in the coupled string may be imparted equally throughout the conveyors of the string. The coupling means for linking together the cars and the conveyors is so designed as to permit the string to accommodate itself to curves and vertical irregularities in the trackway. A drive car having a prime mover for imparting the initial oscillatory movement to the coupled conveyors of the string is adapted to be attached at the inby end of the string of coupled cars so that the necessary power for the shaking conveying action may be provided. Said drive car is in turn adapted to be positioned, at its inby end, to the outby delivery end of a mobile loader, such for example as the loader disclosed and claimed in our copending applications Ser. No. 534,030, filed May 4, 1944, and Ser. No. 551,828, filed Aug. 30, 1944 and since issued as Patent No. 2,430,364. Such mobile loader is referred to by way of illustration as a preferred unit for cooperation with the apparatus of the present invention, but same is not confined to cooperate with such type of loader, as other known types of mobile loaders may be employed or the invention may also be used in hand loading operations or in connection with various types of conveyor apparatus as will be obvious.

A general view of the invention disposed for operation at a room face is shown in Figs. 1 and 2. As shown, a mass of shot-down coal C is being loaded at the face of a room. Said room comprises the solid seam of coal S, the room R, the floor F, and the solid side ribs A and B. In this form of mining, a horizontal kerf is cut, either across the bottom or the top of the solid seam through a width of approximately six feet to undercut the portion C which extends from rib A to rib B across the entire face of the room. This undercut portion of the seam is then drilled and shot down with explosive to form a shot-down mass C which may be loaded out by hand or by a mobile loader as shown. The mobile loader unit 1 is shown in the loading position and has begun to load out the center portion of the shot-down mass of coal C.

The loading and conveying apparatus here illustratively embodied comprises first, the loader unit 1 which is mounted to travel lengthwise of the room on the centrally-disposed trackway 10. Said trackway is laid along the mine floor, either at the seam bottom or in a somewhat depressed trough therein which may be formed by mining out a portion of the bottom rock when it is desired to form track passageway of greater than seam height. The next unit in the apparatus, which is designed to receive the coal loaded by the loader unit 1 and transfer same rearwardly or outwardly to the cars comprises the mobile drive car or unit 20. Next in line in the chain or string of apparatus are disposed a plurality of the novel coal conveying and receiving car units 30, each of which is interchangeably identical with the other and adapted to be linked in an indefinite series for carrying out the purposes of the invention.

Referring first briefly to the same constructional faetures of the mobile loader (which, in the preferred form, of itself constitutes no specific feature of the invention) same is shown as constructed in accordance with the principles disclosed in our copending application Serial No. 551,828, since issued as Patent No. 2,430,364, filed August 30, 1944, but it will be understood that mobile loaders of the same general type, or different types of mechanical loaders, and also loading by hand, may be employed to feed the coal-conveying and receiving apparatus comprising the subject matter of the present invention. Said mobile loader unit 1 as illustratively shown comprises the loading head 2 which is extendable into and under the shot-down mass of coal C and is equipped with conveying apparatus 3 for receiving and rearwardly transporting the coal which is gathered thereupon. Said loading head is pivotally mounted for horizontal movement about a vertical axis on wheeled carriage or truck 5. Thus the loading head is adapted to be advanced forwardly from the end of the trackway 10 into the shot-down mass and to be turned horizontally as it advances to load out the entire mass C across the room face, as more explicitly disclosed in said copending application Serial No. 551,828. The loading head is also pivotally articulated at several points between the vertical axis and the front end thereof to permit same to lie in angular conformity with the mine bottom beneath the shot-down mass. An intermediate conveyor unit 6 overlies the carriage 5 for receiving the coal from the rear end of the loading head 2 and conveying same rearwardly and upwardly to discharge onto the reeciving surface of rear endless conveyor unit 7. The front end of said rear unit 7 is pivotally mounted on the carriage 5 and is adapted to be swung about a vertical pivot thereupon so as to deliver the coal from its rear elevated end to any point within its arc of movement.

Figure 10:
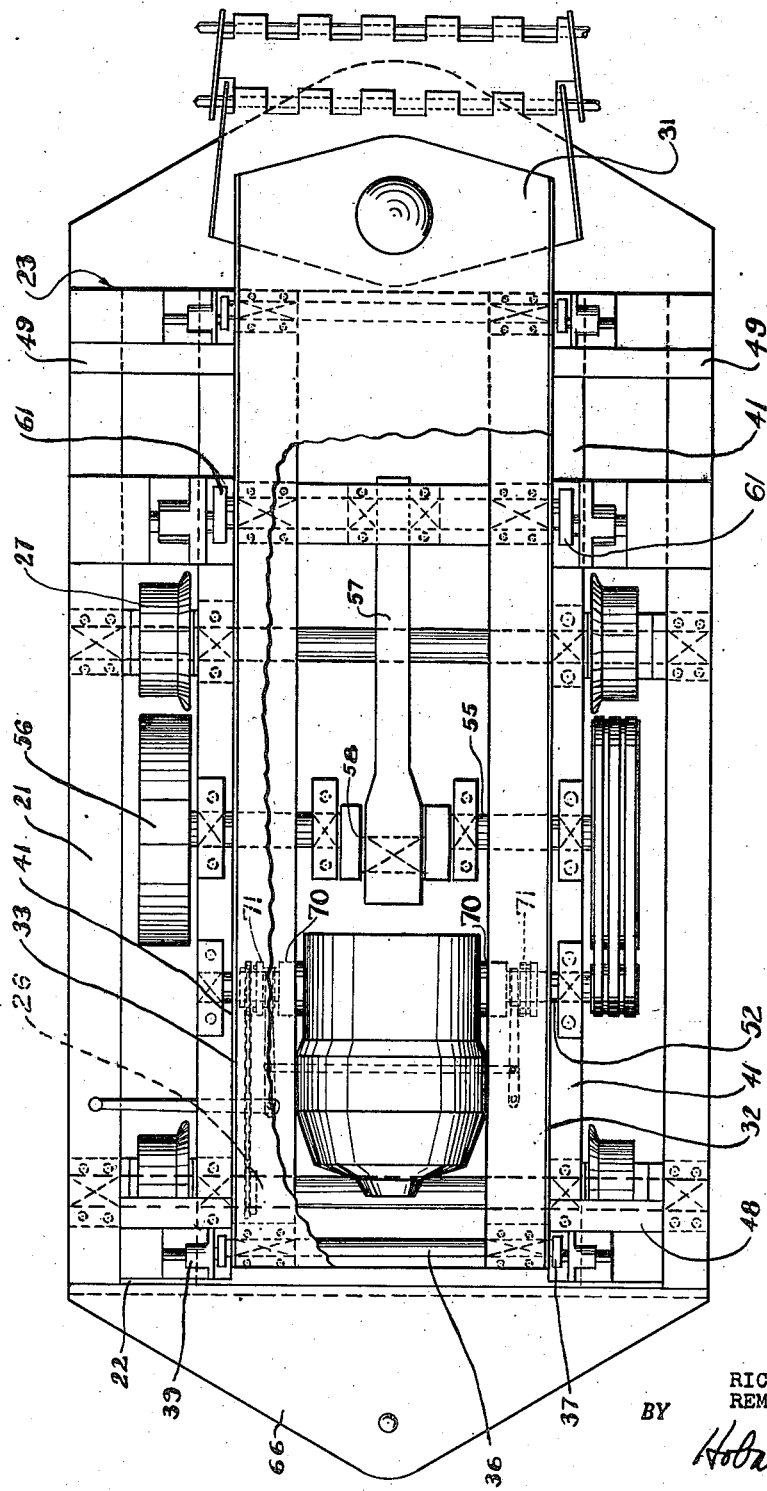
Fig. 10 is a top plan view of the conveyor drive car, parts being broken away to show the driving mechanism.

Referring next to the intermediate or drive car unit 20, as shown, same is designed to receive and convey coal from the rear or outby end of the mobile loader conveyor unit 7, across the top of said drive car 20 and therefrom onto the receiving conveyor of the coupled, next adjacent unit 30. In addition, said drive car is adapted to provide the motive power for the oscillating or shaking movement imparted to the shaking conveyor above said drive car and also to the coupled shaking conveyors of the car units 30 in the string. The constructional elements of said drive car are shown in Figs. 10 and 11.

Said drive car comprises a main rectangular frame or carriage having vertical side plates 21 and end cross frame members 22 at the rear and 23 at the front. Said relatively low rectangular frame is supported on two sets of wheels 24 and 25 mounted on conventional axles 26 at the rear and 27 at an intermediate front portion of the frame respectively, said axles being journalled in the side frame members 21 as shown. The interior of the rectangular carriage is open and is there adapted to support conveyor driving mechanism.

Referring now to the shaking conveyor mechanism which is mounted over the above-described drive car carriage and adapted to be drivingly oscillated with respect thereto, same comprises a relatively narrow longitudinal flat pan 31 which is disposed lengthwise centrally of and above the top of the carriage frame. Said conveyor pan 31 is a flat plate and is provided with relatively shallow upstanding side walls 32 and 33 and open ends. The conveyor pan is cradled for longitudinal oscillating motion with respect to the carriage frame. For this purpose the inby end of the conveyor pan is provided with brackets 35 depending from the pan bottom 31, which brackets are journalled on cross shaft 36 which underlies and extends across the bottom of the pan near the inby end thereof. Pivotally connected to the shaft 36 at either end thereof is a pair of supporting links 37, the lower ends of said links being journalled on the projecting ends of the shaft 36, and the upper ends thereof being journalled about the ends of supporting stub shafts 38. Said stub shafts are fixed to and project from vertical supporting brackets 39 at either side of the conveyor pan, the lower ends of said brackets 39 being seated on supporting blocks 40 which in turn are fixed to the upper surfaces of longitudinal beams 41 extending the length of the main frame of the carriage and constituting inner horizontal constructional struts thereof. In similar manner the outby end of the conveyor pan is oscillatably supported by depending pairs of links 45 which are similarly journalled from shafts projecting from the upper ends of said brackets 46 resting on supports 47 near the forward ends of the struts 41. Additional support for the supports 40 and 47 is provided by cross pieces 48 and 49 respectively which bridge from the tops of the side walls 21 onto the tops of the struts 41 as shown. For purposes of efficient operation of the shaker conveyor, the outby end thereof, supported by the links 45, is preferably slightly higher than the inby end, supported by the links 37, the longitudinal pitch or slope of the conveyor pan being preferably in the order of $\tfrac{3}{16}''$ per foot.

Means are provided for imparting the desired reciprocatory or oscillating movement to the conveyor pan 31 in the lengthwise direction so as to cause the pieces of coal lying thereupon to be moved lengthwise from the lower or inby end toward the upper or outby end thereof. For this purpose a driving motor 50 is mounted beneath the bottom of the conveyor pan between the struts 41 of the car frame. Through a suitable reduction gearing 51 said motor drives a cross shaft 52 which, through drive belt 53 and pulley 54 turns drive shaft 55, which shaft is suitably journalled in the struts 41 and at its opposite end is provided with a fly-wheel 56. A pitman 57 is drivingly connected to an eccentric 58 at the center of the shaft 55, the forward end of said pitman being pivotally connected to drive a transverse shaft 60. Said shaft 60 is journalled in the depending ends of links 61 at either end thereof, the upper ends of said links being journalled on stub shafts 62 which are supported on the struts 41. Thus the eccentric motion of the pitman imparts its oscillating motion to the conveyor pan.

Said motion is such as will cause the pieces of coal lying on the pan to be projected upwardly along said pan, that is, toward the outby end of the drive car. For this purpose the eccentric 58 is designed to impart a relatively slow rising motion to the pan and a more rapid following return motion. This type of motion is common in certain types of shaker conveyors and also in mountings of vibrating pneumatic cleaning or separating tables, for example.

The inby end of the drive car frame is adapted to be coupled to the adjacent end of carriage 5 of the mobile loader. For this purpose the horizontal draw bar 65 overlies the tapered bumper member 66. The draw bar is apertured at 67 and the bumper at 68 to receive a coupling pin for pivotal connection to a coupling link which is adapted to be similarly linked at its opposite end to similar coupling means on the outby end of the mobile loader truck 5. As will be clear from the drawings a similar coupling construction is provided at the outby end of the drive car.

The drive car unit 20 is also designed to propel itself and any car conveying units 30 which may be coupled thereto, along the tracks through the mine, thereby providing motive power for a string of such conveyor cars for moving them into and out of the rooms without requiring auxiliary locomotives or other coal car traction means. For this purpose, driving connections are provided between motor driven cross shaft 70 and one of the wheel axles 26, thereby to propel the truck along the tracks. Any suitable clutch or coupling means 71 may be provided for connecting and disconnecting said drive, and for similarly uncoupling and coupling respectively the drive from the motor to cross shaft 52. By this arrangement it is possible to propel the drive car along the tracks while the drive to the conveyor actuating pitman 57 is silenced and vice versa. Any suitable conventional means (not shown) for supplying power to the motor 50 while the drive car is moving along the tracks, such as a trolley, will be provided in the usual manner.

Referring now to the general construction of the coal receiving and conveying unit cars 30, each of said cars is identical and interchangeable in construction with the others so that the description of one will suffice for all. The general construction of such car units will be clear from the showing of Figs. 4, 5 and 6, comprising two general constructional subunits, that is, the car itself for receiving the coal being loaded, and the shaker conveyor mechanism which extends lengthwise across the top of the car for conveying the coal thereto and to the cars beyond. Referring first to the construction of the car itself, same comprises a relatively conventional open-top box-like or gondola construction having vertical side walls 130 and 131 and vertical end walls 132 and 133. The bottom of the car is conventionally shown as a flat closed plate 134, but in practice conventional means (not shown) for dumping or removing the coal from the bottom of the car by movable dump plates or other known means may be provided.

The car body described above is mounted on two sets of simple flanged track wheels 135 suitably spaced from either end of the car and journaled on conventional axles (not shown). Said cars are preferably considerably wider than the trackway 10 so that the sides of the car overhang said tracks. Accordingly the wheels are preferably adapted to run in recessed portions of the car bottom 134 (not shown) thereby to enable the depth of the car to be as great as possible within the limited head room of the mine.

Referring now to the shaker conveyor means mounted on top of the car 30, same is shown in Figs. 4 to 9. Said means comprises a longitudinally oscillatable shaker pan 140 or tray designed to operate, so far as its conveying action is concerned, in substantially the same manner as the conveyor 31 on the drive car described above. The bottom of said pan 140 is upwardly convex or shaped in an inverted V, as shown in Fig. 3, for example, said shape being preferably provided to facilitate the lateral discharge of the coal from the surface of the conveyor pan as hereinafter described. At the inby end the conveyor pan is provided with upstanding side walls 141, the ends of which are laterally flared to provide a somewhat wider receiving end for the conveyor thereat. The opposite or outby end is also provided with upstanding side walls 142 which are preferably parallel and extend with the pan beyond the end 133 of the car. The embodied means for supporting the conveyor pan 140 along the center top of the car 30 comprises three cross bars or struts 143, 144 and 145 which extend across the top of the car walls 130 at either end and in the center respectively. Said strut 143, for example, provides support for upstanding brackets 149 at either side of the tray walls 141, which brackets support stub shafts 150 on which depending oscillatory links 151 are journalled. The lower ends of said links are journalled about the projecting ends of a transverse shaft 152 which extends through a sleeve 153 which underlies and is fixed to the bottom of a plate bracket 154 underlying and extending across the bottom of the conveyor pan. By means of this construction, the conveyor pan is cradled for oscillatory movement with respect to the brackets 149 which, through the cross strut 143, are fixed to the body of the car 30. As will be clear from the drawings, the conveyor pan is supported in like manner by links depending from brackets 155 supported on the center cross strut 145 and also by links depending from the brackets 156 supported on the rear cross strut 144. It will be noted that the conveyor pan has a longitudinal rearward and upward slope of the same order as that described with respect to the conveyor pan 31 of the drive car unit. As embodied, a dependent flange 165 extends along either lateral edge of the pan bottom 140 throughout the length of said pan, said flange being provided for longitudinal strength.

Means are provided for delivering coal from the conveyor pan 140, as it travels therealong to any selected section or portion of the car body, this without otherwise affecting or interfering with the continuing conveying action of the oscillating pan. For this purpose we preferably provide means for laterally discharging coal from one or either side of the conveyor pan at any selected point or points therealong. As embodied, each side of the conveyor pan between the fixed side plates 141 and 142, is composed of a series of movable side plates or panels 160, which when held in their normal upright position, constitute continuations of the side walls of the conveyor pan, but which by means described below, may be lowered or otherwise moved from said upright position, thereby to form breaks or openings in the side walls of the conveyor pan, through which the coal may discharge laterally, aided in such movement by the convex slope of the pan 147. The detailed construction for so varying the position of the side plates or panels 160 is shown in Fig. 7.

As embodied, the lateral edges of the pan 140 are serrated to provide inturned claws 166 through which is journaled a gate supporting rod 167. Said rod passes the length of the three side gates 160 between the end strut 143 and the center strut 145. A similar set of rods is provided for the three gates 160 along the other half of the pan at either side thereof. Each of the side gates 160 is provided with similar intermeshing claws 168 which surround and are journalled about the rods 167. Thus each gate 160 is loosely hinged on the rod 166 to turn thereabout from the upright vertical closed position shown in Fig. 4, said gates thus being adapted to swing through an arc of some 200° more or less. By this swinging movement, the gates are adapted to be moved as stated from a closed to an open position, in which latter position they are swung sufficiently far beneath plate 140 to wholly clear the edges thereof.

The embodied means for releasably retaining the gates in their erect or closed positions is shown in detail in Fig. 7 and comprises a pair of horizontally reciprocable latches 170 and 171, mounted on the outer face of each gate and designed to be moved in opposite directions to release said gate. The latch bar 170, for example, is horizontally movable through an aperture in the flanged end 173 of the gate 160 and thence passes through a similar aperture in the flanged wall 174 of the U-shaped upstanding panel 175 which is provided between each of the sets of gates 160. When seated in the closed position, the end of the latch is overlain by a cover plate 176 on the face of said panel 175. The latch 170 is urged to the closed position shown by helical spring 178 which surrounds pull rod 179 attached to the end of the latch bar 170. The latch is pulled to the open or unlocked position by means of a link 180 attached to one end of pivoted lever 181, the other end of which is pivotally connected to a manual pull rod 182 which overlies the end flanges 173 and 174 and normally lies at about the center of the intermediate fixed plate 175. A similar spring 184 and lever means 185 are actuated by a connecting rod 186 so that a pull exerted on the rod 182 will simultaneously withdraw both the latches 170 and 171 and permit the gate 160 to swing down about the rod 167 to the lower or open position. It will thus be clear that any or all of the side gates 160 along both sides of the conveyor pan 140 may be selectively opened and left open as long as desired, thereby permitting coal to be progressively discharged into the body of the car from any desired position of the conveyor pan.

In Fig. 6 is shown the action of the conveyor in discharging coal into the car from a portion of the conveyor where the gates 160 have been opened. It will be seen that by such means the entire body of the car will be filled with coal which is spilled over the edges of the shaking plate 140 and the coal built up until it lies in contact with the edges of said shaking plate. Thus it will be seen that the entire body of the coal car will be filled with the exception of the relatively small space just below the conveyor plate itself. It will further be clear that the top of said conveyor plate extends above the top of the car no higher than would a pile of coal normally filling said car if the conveyor plate were not there. Thus our apparatus is designed to operate in mines having very low seams inasmuch as the conveyor mechanism itself takes up no more space than would a normal car itself. It will further be noted that no apparatus is needed or used in which support is taken from the roof of the room or any other part of the apparatus except the cars themselves.

The invention provides means for coupling the ends of the conveyor pan 140 to the complementary ends of similar conveyor means in next adjacent cars 30 in a string thereof. This means has several functions. First, it effects transmission of the shaking motion so that the conveying action is continued from one car to the next; second, it permits relative horizontal angular movement between the conveyors of the coupled units 30; third, it permits vertical angular movement between coupled car units as when two cars may rest on parts of tracks having different slopes; and fourth, it also permits differences in the transverse angularity between cars and conveyor units as when the portion of the track beneath one car having different side slope or list with respect to the next car. Referring to Figs. 4 and 5, the inby or forward end of the conveyor plate 140, which is the low end thereof is overlapped and underlies a coupling plate 190 which is permanently affixed thereto. Said plate 190, which is flat in cross-section and has upstanding side walls or flanges 191, is somewhat tapered longitudinally so as to lie well within the flared end of the conveyor pan 140 and the walls 141 thereof, thereby leaving a substantial transverse clearance between said walls 191 and 141 so as to permit a substantial horizontal angular motion between the coupling plate 190 and the conveyor plate 140 (Figs. 4 and 9). The coupling plate 190 which acts as a connecting trough to feed coal onto the inby end surface of conveyor plate 140 from the next adjacent unit, is connected to said plate 140 for relative horizontal angular movement with respect thereto. Said connection comprises the vertical bolt or shaft 195 having a flat head 196 which lies on top of the plate 190, passes loosely through an aperture therein, through a similar alined aperture in the plate 140 and is threaded 197 at its lower end to receive a hex nut 198 which is preferably held in position by a cotter pin 199.

This construction as shown also permits substantial relative transverse rocking motion between the coupling plate 190 and the conveyor plate 140. For that purpose a substantial clearance is provided between said two plates due to their difference in angularity, while a convex fulcrum bar 200 is supported on the upper surface of the nut 198 and underlies the center line of the convex plate 140. Due to the difference in angularity between the upper convex surface of said fulcrum and the overlying concavity of the plate 140, a substantial rocking motion can take place. A convex washer 201 may be provided between the plate 140 and the fulcrum to take up wear.

As will be seen from Fig. 4, the inby or left-hand end of coupling plate 190 is provided with a plurality of inturned claws 205 which are adapted to mesh with similar claws 206 on an intermediate coupling plate 207 which is used to join the inby end of one car conveyor to the outby end of the next adjacent unit. A coupling rod or shaft 208 passed through the loops in the intermeshed claws 205 and 206 pivotally joins said plates together. The opposite or inby edge of said plate 207 is similarly provided with claw members 209 which in turn intermesh with complementary projecting claws 210 on the outby coupling plate or trough 215 which extends from and underlies the outby end of the conveyor plate 140. The rod 211 hinges the plates 207 and 215 together so that by means of such coupling a substantial change in vertical angularity between coupled conveyor units may take place. The plate 207 and the plate 215, like plate 190, are flat in cross-section and are tapered lengthwise so as to permit advance of the coal from one plate to the other. Thus, (Fig. 8) the side walls 141 of conveyor plate 140 lie within the rear side walls 216 of plate 215, while the outby end of said walls 216 lie within the inby ends of similar walls 212 of similar walls 212 of plate 207. Plates 140 and 215 are joined by vertical bolt 218, the head of which projects through a conforming opening in the bottom of plate 140 and overlies the bolt opening in plate 215. A horizontal plate 219 is welded to the bottom of plate 140 and serves as a take-up surface for tightening the nut 220 on the bolt.

Each car is designed to be coupled at either end to the next adjacent cars of the string, said coupling means being designed for normally loose linkage during transit of the train of cars through the mine, but provision being made for eliminating slack between cars when the conveyor units thereof are linked together for loading operation so that the coupled conveyors can oscillate as a unit. Referring first to the normal loose linkage for transit purposes, same may comprise the relatively simple arrangement shown in Fig. 5 wherein a tapered bumper block 225 projects longitudinally from the lower part of the end 133 of the car body. A draw bar 226 extends horizontally from said end of the car to a point somewhat short of the tapered nose of the bumper, said draw bar being apertured to permit passage of the vertical link pin 227 therethrough. The lower end of the link pin is loosely socketed in a suitable recess in the bumper 225. The head 228 of the pin rests on the top surface of the draw bar. An elongated, slotted coupling link 230 is designed to be held pivotally in place by the pin 227 below the draw bar and resting upon the upper surface of the bumper 225. The opposite end of said link 230 is adapted to be similarly coupled to the draw bar 231 formed at the opposite or inby end of the next car, there resting upon the inby bumper 233.

It will be noted that the draw bars 226 and 231 are positioned near the tops of the cars and thereby relatively close to the linkage between conveyors of adjacent units. This arrangement tends to reduce differences in angularity between the couplings of the cars and the couplings, particularly with respect to the angular motion taking place between cars when the train is moved over a vertical curve or change in level in the track.

The arrangement just described permits substantial angular freedom between the cars in transit, while permitting considerable play or slack between the cars. In accordance with the invention, as referred to above, means are further provided for taking up this play or slack when the conveyor units are linked together by the coupling plates 207, thereby restricting the angular movements between the cars of the train to the scope permitted by the couplings of the conveyors themselves. Such means are shown in Figs. 15 and 16.

In this preferred form, the outby bumper 225 of each car is made shallower than the inby bumper thereof and a movable auxiliary bumper or interponent is suspended below the bottom of said outby bumper 225, said auxiliary bumper being normally retracted to lie flush with the end of said outby bumper, but is movable into an advanced position wherein it fills up the slack or free play space normally existing between the ends of the adjacent bumpers. In said advanced position therefore, the adjacent bumpers are effectively in contact with each other so that no longitudinal play or slack exists between cars in the train. However, the pivotal actions of the couplings between cars remain so that the cars may move around curves in the track substantially as freely as otherwise. This feature of the invention is of importance in preserving uniformity of space between the cars at all times when the ends of the conveyor units thereof are coupled together for conveying and shaking action. Thus with this arrangement the train of linked cars and conveyors may be moved along the track by the movement of the loader while loading, all without disturbing the oscillating and conveying motion of the linked conveyors on the tops of the cars.

Referring to the preferred showing in detail, the bumper 225 is provided with an underslung auxiliary bumper member 287. Said auxiliary bumper is substantially V-shaped in plan with a rounded nose portion which conforms in curvature to the rounded nose portion of the bumper 225 above it and in the retracted position fully underlies and is flush with the end or nose portion of said bumper 225. One end of the auxiliary bumper 287 is pivotally suspended from the bottom of the bumper 225 by a pin 288, the lower end of which passes through a suitable aperture near the left hand end of the auxiliary bumper and is pivotally affixed to and supports same by suitable nut and washer 291. The central portion of the auxiliary bumper is supported from the bumper 225 by a similar pin 292, the lower end of which passes through a radial slot 289 in the auxiliary bumper so that said auxiliary bumper can turn about the pin 288 within the angular limits of said slot 289. The advanced position of said auxiliary bumper is indicated by dotted lines, it being designed to extend, in practice, for a distance of about two inches to contact with the inby end of the next adjacent bumper 233, that being the amount of play preferably permitted by the coupling links 230.

Means are provided for moving and holding the auxiliary bumper 287 in said advanced position and for returning same to the retracted position as desired. For such purpose the free or right hand end of the auxiliary bumper 287 is pivotally connected through pin 286 to an operating link 285. The opposite end of link 285 is pivotally connected by eye 293 and pin 299 to the eccentric 284, said eccentric being fixed to the bottom end of pin 283. Said pin extends upwardly through the bumper 225 and its upper end, which projects thereabove, is fixed to one end of the horizontal actuating arm 282. An actuating knob or handle 280 extends upwardly from the opposite end of said arm.

In operation the auxiliary bumper is held in its retracted or full line position when the arm 282 extends to the left or toward the center of the bumper as shown. By rotating the arm 180°, the eccentric 284 is similarly rotated, thereby rocking the auxiliary bumper forward about pin 288 and thus moving same into the advanced position where it will remain so long as the arm is so fixed. For purposes of minute adjustment and taking up wear, the link 285 may be formed in two mating threaded parts as shown.

A modification of the means for driving the shaker conveyor units is shown in Figs. 12, 13 and 14. This modification comprises the provision of conveyor driving means mounted directly on the outby or delivery end of the mobile loader unit 1 so that the intervention of a drive car unit 20 between the first or inby car 30 of the string and said mobile loader may be eliminated. Accordingly, in this modification eccentric or oscillating driving means for the shaking conveyors on the car units 30 are mounted directly on said outby end of the mobile loader itself and the outby or tail conveyor unit 7 of the mobile loader is adapted to transfer the coal directly into the inby end of the first car conveyor.

This construction is shown, somewhat diagrammatically, in Figs. 12 and 14. As embodied the tail conveyor 7 of the mobile loader 1 is mounted for horizontal angular movement upon a turntable having a circular track bed 300 supported on the outby portion of the mobile loader carriage 5. The rotatable portion of the turntable, which directly supports the belt conveyor 7 comprises a plurality of track engaging rollers 301 connected to form a rotary turret 302 on said trackway 300. The outby end of the conveyor 7 is elevated to overhang the inby end of the coal receiving chute 190 comprising the inby end of the shaking conveyor (Fig. 4.) The overhang of the outby end of the conveyor 7 with respect to the right end of said chute 190 is sufficient to always deliver coal to said chute through the full oscillation thereof.

Means for imparting the oscillating drive to the conveyor unit 140 of the inby car 30 comprises drive shaft 310 driven from motor and reduction 311 which are supported at one side of the turntable turret so as to turn therewith. Driving motion is transmitted to a cross shaft 340 from shaft 310 by belt and pulley drive 312. Said shaft underlies the conveyor unit 7 and is supported from and is provided with cantilever support from the rotary turret 301 by beams 313 which extend therefrom. The shaft is provided with a centrally disposed eccentric 314 which imparts oscillatory motion to a pitman 315. The head of said pitman is a yoke 316 which is drivingly coupled to bottom plate 140 of the shaker conveyor, by means of a depending bolt 320, through pin 321 which passes through the sides of the yoke 316 and opening 321 in the bolt. The upper or head end 322 of said bolt is seated on and passes through the plate 140 and is rapidly affixed thereto by threaded nut 323 and a series of intermediate washer plates as shown in Fig. 13.

The outby end of the mobile loader carriage 5 is provided with a bumper 330 and draw bar 331 by means of which link coupling is made with the corresponding inby bumper 233 and draw bar 231 of car 30, the link pins and connecting ling 230 being connected as previously described. The bumper 330 will preferably be provided with the auxiliary extensible bumper construction shown in Figs. 15 and 16 and described above, thereby to consolidate the linkage between the mobile conveyor and the first car 30.

The operation of the invention will be generally clear from the foregoing. As shown in Figs. 1 and 8, by virtue of the coupling means described, the entire string is adapted to conform to angular curvatures and irregularities in the trackway both horizontally and vertically in all three dimensional planes. The string when so coupled constitutes a complete loading and conveying unit so that as the mobile loader progresses into the shot-down coal and thereby is drawn inby through the use of ropes and jacks as indicated in Fig. 1 and more fully described in our copending application Serial No. 534,030, filed May 4, 1944, the entire string of cars will travel forwardly along the track with the carriage of the loader, and thus be continuously in the positions to receive the coal which is continuously conveyed thereto by the mobile loader. The cars of the string are successively filled by means of the selectively operable discharge gates 160 on the shaker conveyor units, the loading preferably beginning with the outby car and progressing inby therefrom as each car is loaded to capacity as shown in Fig. 6. Preferably enough cars are interconnected in the string so that the entire shot-down mass constituting the face C can be loaded by continuous operation into the cars of the string. When the entire mass C has been so loaded, the string of cars may be uncoupled from the loader and shunted out to the entry by the drive car unit 20 which then acts as a shunting locomotive for the string. The loader is withdrawn from the face sufficiently for the next cutting and shooting operation, whereupon a fresh string of cars is drawn into the room and hitched up to the loader to begin a new loading cycle. It will be obvious that in this manner no time is lost as in the previous practice of individually loading and withdrawing loaded cars and replacing them with individual empty ones. Moreover the loader itself need not stand idle but may be taken into an adjoining room for loading while the other mining operations progress in the room which has just been loaded out.

It will be understood that by means of the invention, car units 30 may be designed so as to carry the coal loaded therein all the way out to the surface of the mine without requiring any intermediate transfer of the coal from them to another type of car or conveyor. It will further be clear that the complete interchangeability of the car units 30 enables them to be used in any number and in any position in the mine. Where a very large amount of coal is to be loaded in one operation, as in certain long wall mining operations, it may be desirable to provide one or more auxiliary drive car units 20 which may be interspersed in a very long string of cars capable of handling such capacity. By this means the driving and conveying force required for such a long string of cars may be built up through the use of such intermediate drive units.

It will be found that by use of the invention the effective operating length of rooms may be substantially increased. That is, while in present operation about 300 ft. is considered the practical limit for the length of a room because of the time consumed in the return of empty cars, etc., as described above, we have found it practicable by the present invention to operate with rooms as long as 600 ft., thereby greatly reducing the development cost of room headings, in that the room head centers can, by virtue of the invention be spaced at least twice the usual distance about it.

The invention in its broader aspects is not limited to the specific mechanisms shown and described but departures may be made therefrom within the scope of the accompanying claims without departing from the principles of the invention and without sacrificing its chief advantages.

What is claimed is:

1. In apparatus for loading and conveying coal, in combination, a plurality of cars having coal-receiving bins, said cars being coupled together in a string, each car having a shaking conveying unit mounted thereon and oscillatable relatively thereto, means for coupling the conveyor units on the successive cars so that said units are movable together to convey coal the length of the string of cars, a driving unit for shaking said coupled conveying units together, and means for delivering coal from any conveyor unit into the bin of the car on which it is mounted.

2. In apparatus for loading and conveying coal, in combination, a plurality of cars having coal-receiving bins, said cars being coupled together in a string, each car having a shaking conveying unit mounted thereon and oscillatable relatively thereto, means for coupling the conveyor units on the successive cars so that said units are movable together to convey coal the length of the string of cars, a driving unit for shaking said coupled conveying units together, and means for delivering coal from any conveyor units into any selected portion of the bin of the car on which it is mounted.

3. In coal loading and conveying apparatus, in combination, a car having an open body for receiving coal, a shaking conveyor mounted on the car for conveying coal over the top of said body, and also into said body, said car and conveyor being portable together as a unit, said conveyor having means positionable variously for delivering coal at selected points throughout its length.

4. In coal loading and conveying apparatus, in combination, a car having an open body for receiving coal, a shaking conveyor mounted on the car for conveying coal over the top of said body, and also into said body, means on said conveyor for selectively directing coal therefrom into a selected part of said body, said car and conveyor being portable together as a unit, drive means for imparting movement to the conveyor to move same relatively to the car, a second similar car having a similar conveyor mounted thereon, and means for coupling said cars and their respective conveyors together, said drive means imparting movement to both said conveyors when so coupled.

5. In coal loading and conveying apparatus, in combination, a car having an open body for receiving coal, a shaking conveyor mounted on the top of said car and disposed longitudinally thereof to convey coal along the top of the car from one end thereof to the other, means on said conveyor for selectively loading said car therefrom at various points throughout its length, means for coupling an end of said conveyor to another similar conveyor on another car, said coupling means permitting horizontal and vertical angular movement between said conveyors, and single driving means for shaking said coupled conveyors together.

6. In coal loading and conveying apparatus, in combination, a plurality of bin cars mounted on a track and coupled together to form a string, each of said cars being provided with a shaking conveyor unit extending therealong and connected thereto, means on said units for selectively delivering coal into the bin of any of said cars, means for coupling each said conveyor unit to those on the adjacent cars of the string so that said coupled conveyor units operate together, said coupling means being articulated to permit turning movement between conveyor units to accommodate the coupled string to curves in the track, means for moving said coupled conveyor units in unison to convey coal along the string of cars and means for moving the string of cars in transit while so coupled and while said conveyor units are moving.

7. In coal loading and conveying apparatus, in combination, a plurality of cars mounted on a track and coupled together to form a string, each of said cars being provided with a shaking conveyor unit extending therealong and connected thereto, means for coupling each said conveyor unit to those on the adjacent cars of the string so that said coupled conveyor units operate together, means for selectively delivering coal from any of said units into its supporting car, a power unit for moving said string of cars in transit along said track and for imparting conveying movement to said conveyor units, and a loading unit for delivering coal to one of the conveyor units, said loading unit also being driven by said power unit.

RICHARD PEALE.
REMBRANDT PEALE, Jr.

REFERENCES CITED

The following references are of record in the file of this patent:

UNITED STATES PATENTS

| Number | Name | Date |
|---|---|---|
| 948,222 | Honabach | Feb. 1, 1910 |
| 966,489 | Torseth | Aug. 9, 1910 |
| 1,427,890 | Zesbaugh | Sept. 5, 1922 |
| 1,488,707 | Parrish et al. | Apr. 1, 1924 |
| 1,563,387 | MacEachen | Dec. 1, 1925 |
| 1,602,779 | Prockter | Oct. 12, 1926 |
| 1,716,101 | Biggs | June 4, 1929 |
| 1,935,106 | Allfree | Nov. 14, 1933 |
| 2,182,139 | Speno | Dec. 5, 1939 |
| 2,188,060 | Robins | Jan. 23, 1940 |
| 2,200,724 | Robins | May 14, 1940 |

FOREIGN PATENTS

| Number | Country | Date |
|---|---|---|
| 220,027 | Germany | Mar. 14, 1910 |